(12) United States Patent
Muro et al.

(10) Patent No.: US 8,675,250 B2
(45) Date of Patent: Mar. 18, 2014

(54) INKJET PRINTING APPARATUS AND CALIBRATION METHOD

(75) Inventors: Kentarou Muro, Tokyo (JP); Susumu Hirosawa, Tokyo (JP); Yutaka Kano, Yokohama (JP); Shigeyasu Nagoshi, Yokohama (JP); Minoru Teshigawara, Saitama (JP); Yoshiaki Murayama, Tokyo (JP); Takeshi Murase, Yokohama (JP); Satoshi Azuma, Kawasaki (JP); Masao Kato, Kawasaki (JP); Minako Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 580 days.

(21) Appl. No.: 12/964,130

(22) Filed: Dec. 9, 2010

(65) Prior Publication Data

US 2011/0279832 A1    Nov. 17, 2011

(30) Foreign Application Priority Data

May 17, 2010  (JP) .................................. 2010-113210

(51) Int. Cl.
| | |
|---|---|
| H04N 1/60 | (2006.01) |
| H04N 1/46 | (2006.01) |
| G06K 9/00 | (2006.01) |
| B41J 2/165 | (2006.01) |
| B41J 2/01 | (2006.01) |

(52) U.S. Cl.
USPC .............. 358/1.9; 358/502; 358/504; 347/24; 347/102; 382/165

(58) Field of Classification Search
USPC .......... 358/1.9, 502, 504, 518, 501, 523, 524, 358/530; 382/162, 167, 165; 347/8, 14, 19, 347/102, 24, 107

See application file for complete search history.

(56) References Cited

U.S. PATENT DOCUMENTS

| | | | | |
|---|---|---|---|---|
| 5,936,649 | A | * | 8/1999 | Ikeda et al. ...................... 347/87 |
| 6,116,728 | A | * | 9/2000 | Miyake et al. ................ 347/102 |
| 6,309,051 | B1 | | 10/2001 | Koitabashi et al. |
| 6,325,492 | B1 | | 12/2001 | Koitabashi et al. |
| 6,428,161 | B1 | * | 8/2002 | Wotton et al. ................. 347/102 |
| 6,488,350 | B2 | | 12/2002 | Iwasaki et al. |
| 6,572,216 | B1 | | 6/2003 | Koitabashi et al. |

(Continued)

FOREIGN PATENT DOCUMENTS

| | | |
|---|---|---|
| JP | 10-268589 A | 10/1998 |
| JP | 2008-102719 A | 5/2008 |

OTHER PUBLICATIONS

U.S Appl. No. 12/964,109, filed Dec. 9, 2010.
U.S. Appl. No. 12/963,664, filed Dec. 9, 2010.

(Continued)

*Primary Examiner* — Madelein A Nguyen
(74) *Attorney, Agent, or Firm* — Fitzpatrick, Cella, Harper & Scinto

(57) ABSTRACT

A waiting time Ts is decided on the basis of ink type information and ink feed amount information, referring to waiting time table A (Step 6). Along with this, a dried printing paper is carried to and stopped in a waiting area 9 (Step 7), a time period T is measured after stopping, and measurement processing in the next step is delayed until the time period T reaches the waiting time Ts. Then, when the time period T reaches the waiting time Ts, a measuring instrument 10 is used to measure a density of a patch printed on the printing paper (Steps 8 and 9).

5 Claims, 11 Drawing Sheets

(56) References Cited

U.S. PATENT DOCUMENTS

| | | |
|---|---|---|
| 6,761,426 B2 | 7/2004 | Tsuchiya et al. |
| 6,877,833 B2 | 4/2005 | Teshigawara et al. |
| 6,918,656 B2 | 7/2005 | Koitabashi et al. |
| 7,023,584 B2 * | 4/2006 | Cowan et al. ............... 358/1.9 |
| 7,114,790 B2 | 10/2006 | Seki et al. |
| 7,303,273 B2 * | 12/2007 | Jurrens et al. ............... 347/102 |
| 7,396,099 B2 | 7/2008 | Teshigawara et al. |
| 7,410,239 B2 | 8/2008 | Takahashi et al. |
| 7,425,056 B1 | 9/2008 | Koitabashi et al. |
| 7,515,318 B2 | 4/2009 | Nishikori et al. |
| 7,575,315 B2 * | 8/2009 | Williams et al. ............ 347/102 |
| 7,600,848 B2 | 10/2009 | Teshigawara et al. |
| 7,898,704 B2 * | 3/2011 | Doi et al. .................... 358/504 |
| 8,147,020 B2 * | 4/2012 | Kariya ......................... 347/14 |
| 2004/0141041 A1 * | 7/2004 | Tsutsumi et al. ............ 347/102 |
| 2004/0196324 A1 * | 10/2004 | Tschida ....................... 347/19 |
| 2005/0018219 A1 * | 1/2005 | Senn et al. ................... 358/1.8 |
| 2006/0033767 A1 * | 2/2006 | Weast .......................... 347/14 |
| 2006/0164492 A1 * | 7/2006 | Brookmire et al. .......... 347/104 |
| 2007/0153074 A1 * | 7/2007 | Anderson et al. ............ 347/102 |
| 2008/0231874 A1 | 9/2008 | Matsuzawa et al. |
| 2008/0273055 A1 | 11/2008 | Takahashi et al. |
| 2009/0116069 A1 | 5/2009 | Nishikori et al. |
| 2009/0189930 A1 * | 7/2009 | Gorbold et al. .............. 347/6 |
| 2009/0231374 A1 * | 9/2009 | Van de Wynckel et al. .... 347/12 |
| 2010/0156981 A1 | 6/2010 | Chikuma et al. |
| 2010/0165018 A1 * | 7/2010 | Ooishi et al. ................ 347/7 |
| 2010/0245446 A1 | 9/2010 | Nishikori et al. |
| 2010/0245470 A1 | 9/2010 | Murayama et al. |
| 2010/0321434 A1 * | 12/2010 | Baba ............................ 347/12 |
| 2011/0063358 A1 | 3/2011 | Muro et al. |
| 2011/0279612 A1 * | 11/2011 | Muro et al. .................. 347/102 |
| 2012/0026264 A1 * | 2/2012 | Ikoshi ......................... 347/102 |
| 2012/0092731 A1 * | 4/2012 | Nishida et al. ............... 358/474 |

OTHER PUBLICATIONS

U.S. Appl. No. 12/964,070, filed Dec. 9, 2010.
U.S. Appl. No. 12/964,109, filed Dec. 9, 2010.

* cited by examiner

| INK | INK FEED AMOUNT [g/m²] | WAITING TIME Ts |
|---|---|---|
| C | 6 | 10 SECONDS |
|   | 12 | 10 SECONDS |
|   | 18 | 10 SECONDS |
| M | 6 | 60 SECONDS |
|   | 12 | 120 SECONDS |
|   | 18 | 180 SECONDS |
| Y | 6 | 10 SECONDS |
|   | 12 | 20 SECONDS |
|   | 18 | 30 SECONDS |
| K | 6 | 20 SECONDS |
|   | 12 | 20 SECONDS |
|   | 18 | 20 SECONDS |

| INK | TOTAL INK FEED AMOUNT [g/m²] | WAITING TIME |
|---|---|---|
| C+M | 12 | 10 SECONDS |
| | 18 | 10 SECONDS |
| C+Y | 12 | 20 SECONDS |
| | 18 | 30 SECONDS |
| C+K | 12 | 10 SECONDS |
| | 18 | 20 SECONDS |
| M+Y | 12 | 150 SECONDS |
| | 18 | 200 SECONDS |
| M+K | 12 | 40 SECONDS |
| | 18 | 60 SECONDS |
| Y+K | 12 | 20 SECONDS |
| | 18 | 30 SECONDS |
| C+M+Y | 12 | 20 SECONDS |
| | 18 | 30 SECONDS |
| C+M+K | 12 | 20 SECONDS |
| | 18 | 30 SECONDS |
| C+Y+K | 12 | 10 SECONDS |
| | 18 | 20 SECONDS |
| M+Y+K | 12 | 30 SECONDS |
| | 18 | 60 SECONDS |
| C+M+Y+K | 12 | 20 SECONDS |
| | 18 | 40 SECONDS |

FIG.8A

| MODE | WAITING TIME |
|---|---|
| 1 | 120 SECONDS |
| 2 | 200 SECONDS |

FIG.8B

| PAPER TYPE | MODE |
|---|---|
| PAPER A | MODE 1 |
| PAPER B | MODE 2 |
| PAPER C | MODE 1 |
| OTHERS | MODE 2 |

FIG.10

INKJET PRINTING APPARATUS AND CALIBRATION METHOD

BACKGROUND OF THE INVENTION

1. Field of the Invention

The present invention relates to an inkjet printing apparatus and a calibration method, specifically, an art to measure an image when the color and color density of an image printed with ink is measured and printing properties of the printing apparatus are calibrated on the basis of the measured result.

2. Description of the Related Art

When calibration is performed, a patch for measurement is first printed. A printing paper on which this patch was printed has relatively large difference in its moisture content between immediately after printing and after fixing a color, due to ink ejected onto the printing paper, so that much difference of color between them occurs. Therefore, in calibration, it is preferable that measurement is performed in a final state of the printing paper, that is, a state where the printing paper is dried and the color is stabilized. In doing so, since natural air drying takes much time, a forced drying mechanism, such as a mechanism to spray the printing paper with hot air, a radiation heating mechanism or a conduction heating mechanism, is often used.

However, if a printing paper is dried using such a forced drying mechanism, the printing paper has a high temperature immediately after drying treatment. Therefore, as this high temperature drops to a temperature of an ambient atmosphere and a moisture content of the printing paper changes to the equilibrium amount in the ambient atmosphere, a color (tone and density) of an image for measurement also changes. As a result, there is a problem that a measured value varies depending on a time when measurement is performed while the color is changing.

To deal with this problem, Japanese Patent Laid-Open No. H10-268589 (1998) describes that a waiting time is provided after a color material is fixed onto a printing paper by a fixing apparatus until measurement. This permits measuring a printed image whose color has been sufficiently stabilized.

SUMMARY OF THE INVENTION

However, a time period required to stabilize a color often varies depending on a type and an amount of ink that is used for printing an image for measurement. FIG. 1A is a graph of a relation between an elapsed time after drying treatment and a color stability for each ink type. In this graph, the color stability is represented by a color difference between each color and a reference color that is a color after 24 hours' elapsed time. The smaller color difference is, the more stable the color is. FIG. 1B is similarly a graph of a relation between an elapsed time after drying treatment and a color stability for each ink amount (an ink feed amount) used for printing an image for measurement. As shown in these Figs., a time period after drying until the color is stabilized varies depending on an ink type or an ink feed amount. Therefore, if a uniform waiting time is set regardless of conditions of the ink type, ink feed amount, etc., an excessive waiting time may be secured in some conditions, thereby reducing an effect of time reduction caused by a forced drying. Or, if a uniform waiting time is set, there may be a case in which measurement is performed in spite of insufficient waiting time. In this case, the measured color is different from the stabilized color. As the result, calibration based on the measurement result does not reflect printing properties at that time.

An object of the present invention is to be able to minimize a waiting time after drying an image for measurement that is used for calibration of printing properties until measurement is started, as well as to be able to measure the image whose color has been stabilized.

An apparatus according to the present invention includes:
a printing unit having an inkjet head;
a drying unit to dry a printing medium on which an image was printed by the inkjet head;
a measurement unit to measure the image of the printing medium dried by the drying unit; and
a control unit to perform control so as to change a waiting time until the measurement unit starts measurement, depending on printing information when the image was printed.

The present invention can minimize a waiting time after drying an image for measurement that is used for calibration of printing properties until the start of measurement and permits measuring the image for measurement whose color has been stabilized.

Further features of the present invention will become apparent from the following description of exemplary embodiments (with reference to the attached drawings).

BRIEF DESCRIPTION OF THE DRAWINGS

FIG. 8A is a table indicating waiting times for each ink feed amount, which is used in calibration processing in the mode 2 ("waiting time table B");

FIG. 8B is "waiting time table according to mode" in which a waiting time is set for each of the aforementioned modes for calibration;

FIG. 10 is a mode table according to paper for selecting a mode for calibration on the basis of type information of a printing paper, according to the third embodiment.

DESCRIPTION OF THE EMBODIMENTS

Embodiments of the present invention will be described in detail with reference to drawings.

Figure 1A:
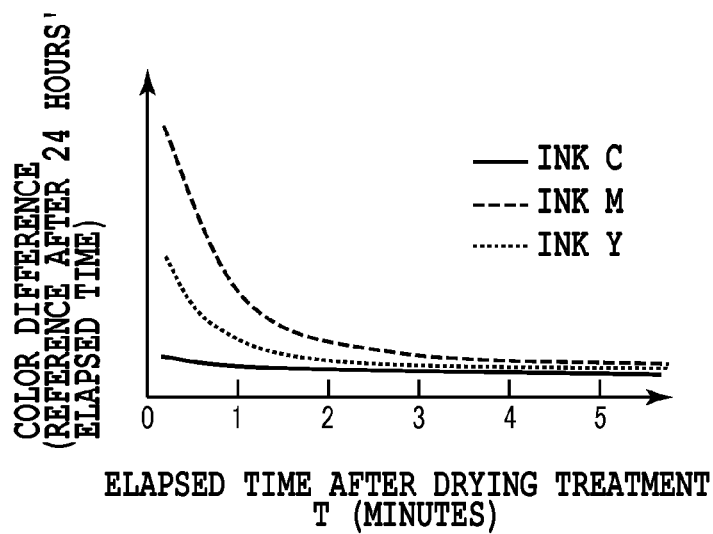
FIG. 1A is a graph of a relation between an elapsed time after drying treatment and a color stability for each ink type.
Figure 1B:
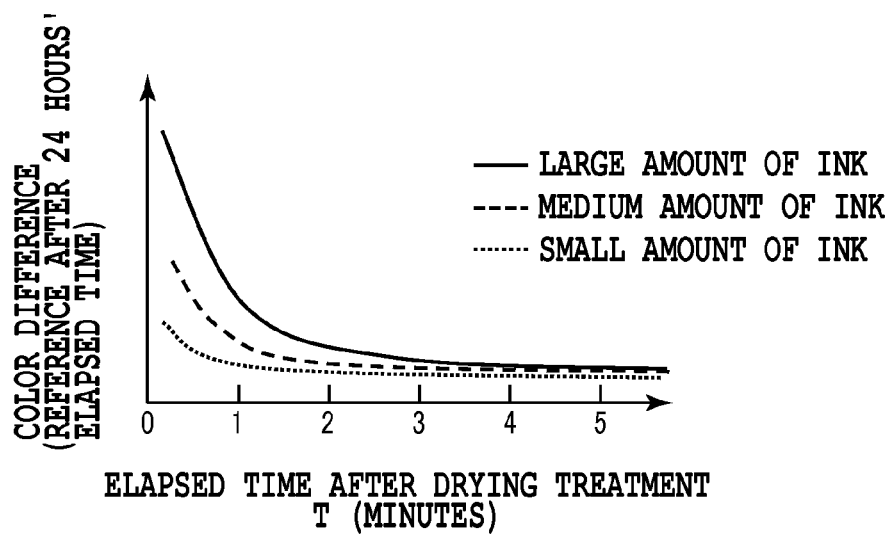
FIG. 1B is similarly a graph of a relation between an elapsed time after drying treatment and a color stability for each ink amount (ink feed amount) used for printing an image for measurement.
Figure 2:
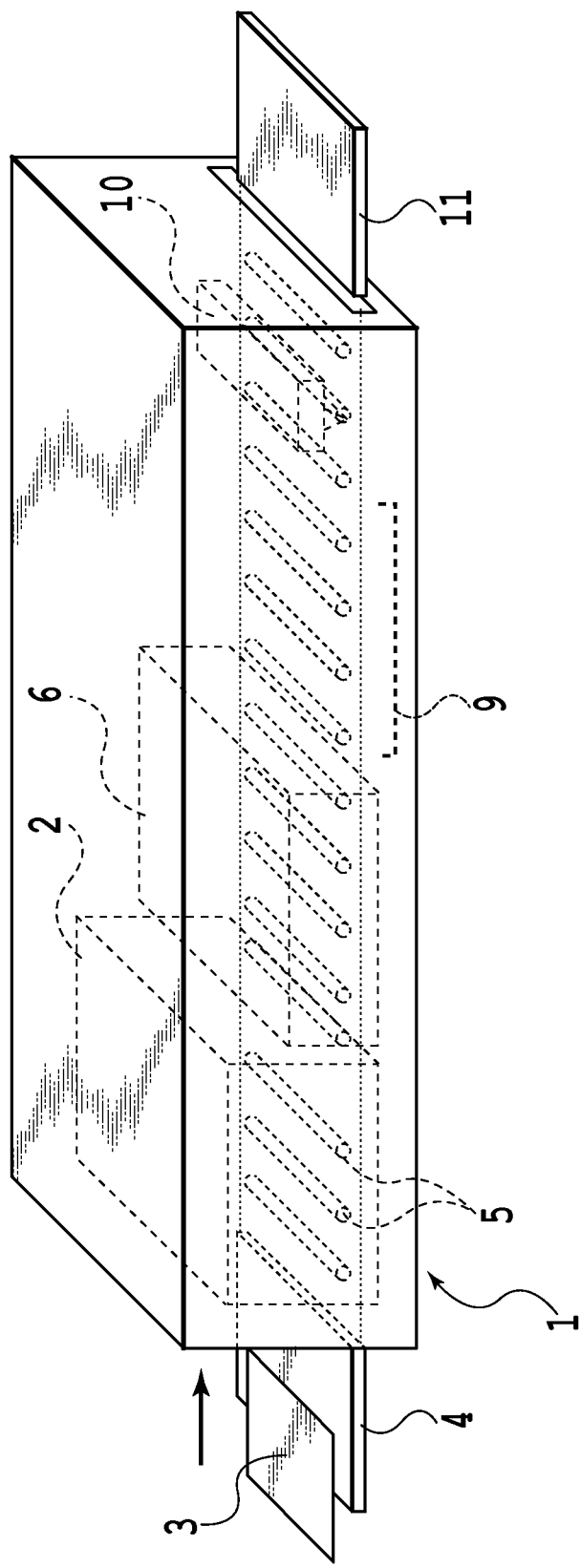
FIG. 2 is a perspective view illustrating a schematic configuration of an inkjet printing apparatus according to one embodiment of the present invention.
Figure 3:
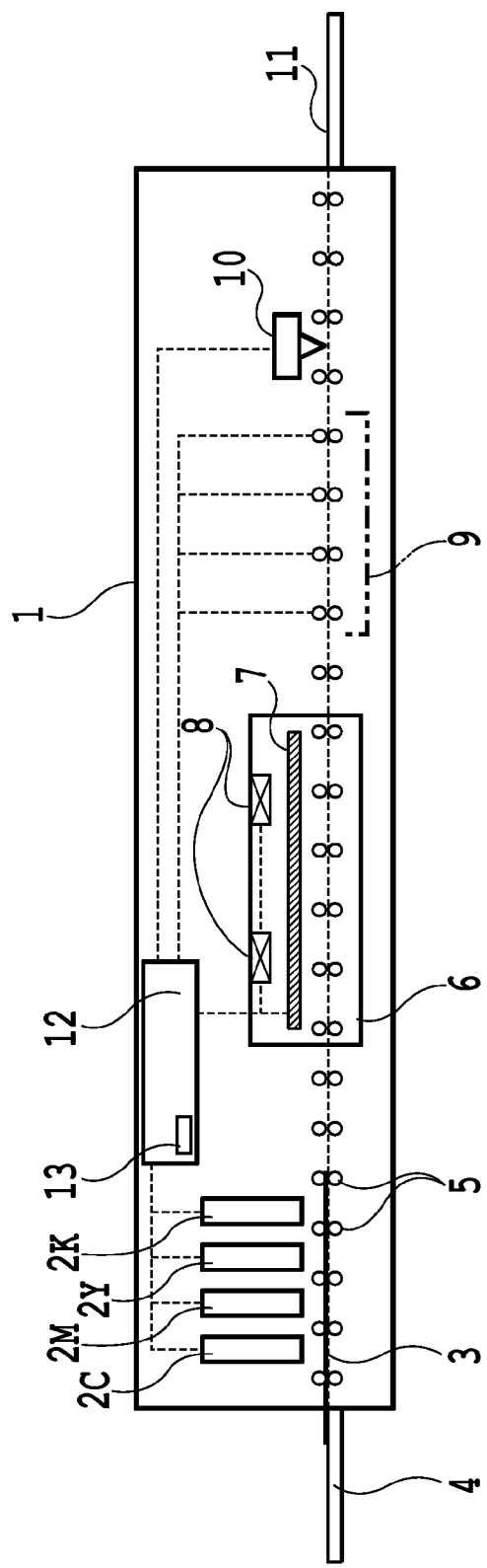
FIG. 3 is a cross-sectional view of the inkjet printing apparatus illustrated in FIG. 2 along the conveying direction of a printing paper.

FIG. 2 is a perspective view illustrating a schematic configuration of an inkjet printing apparatus according to one embodiment of the present invention. FIG. 3 is a cross sectional view of the inkjet printing apparatus illustrated in FIG. 2 along the conveying direction of a printing paper. In FIGS. 2 and 3, if a printing apparatus 1 performs normal printing, a printing paper 3 as a printing medium is fed from a paper feed tray 4 and carried by rotation of a plurality of conveying rollers 5 disposed on and under a conveying path. During this conveying, the printing paper 3 is subject to printing by a printing unit of the print head 2 and drying by a drying treatment unit 6, and then is discharged to a paper discharge tray 11.

In addition to normal printing described above, the printing apparatus 1 performs calibration on a head control parameter in order to appropriately maintain printing properties such as the color and density of an image that is printed with ink ejected from the print head 2. In this calibration, an image for calibration is printed by the print head 2. Then, the printing paper on which the image for calibration was printed is dried by the drying treatment unit 6 and after that, waits in a waiting area 9 on the conveying path for a waiting time that will be described with reference to FIG. 4 and later Figs. The waiting time is set to be variable. After waiting, the printing paper is subject to measurement by a measuring instrument 10 and discharged to the paper discharge tray.

The print head 2 is composed of four print heads 2C, 2M, 2Y, 2K that eject four colors of ink (C=cyan, M=magenta, Y=yellow, K=Black). Each of these print heads is a full-line type inkjet head on which nozzles are arranged over the entire width of a carried printing paper. An inkjet method in this example employs a heating element, but is not limited to this; the method using a piezo element, an electrostatic element or an MEMS element is applicable. In implementing the present invention, it should be appreciated that a type of a print head, the number of colors of inks and the types of inks are not limited to the aforementioned example. In the drying treatment unit 6, a heater 7 and a fan 8 for sending an air stream heated by the heater 7 are provided above the conveying path. The measuring instrument 10 includes a line sensor disposed at the position facing a printing surface of a printing paper and performs measurement while relatively moving this line sensor in the conveying direction of the printing paper.

Various operations and data processing in the printing apparatus described above are controlled by a control unit 12. That is, the control unit 12 performs the above operations and processing according to a program of processing, which will be described with reference to FIG. 4 and so on, stored in a memory 13.

First Embodiment

A first embodiment of the present invention relates to a manner in which an image for calibration is printed with a primary color of each of the print heads 2C, 2M, 2Y and 2K, and a head control parameter corresponding to each of the print heads is set or changed on the basis of the measurement result of the image.

Figure 4:
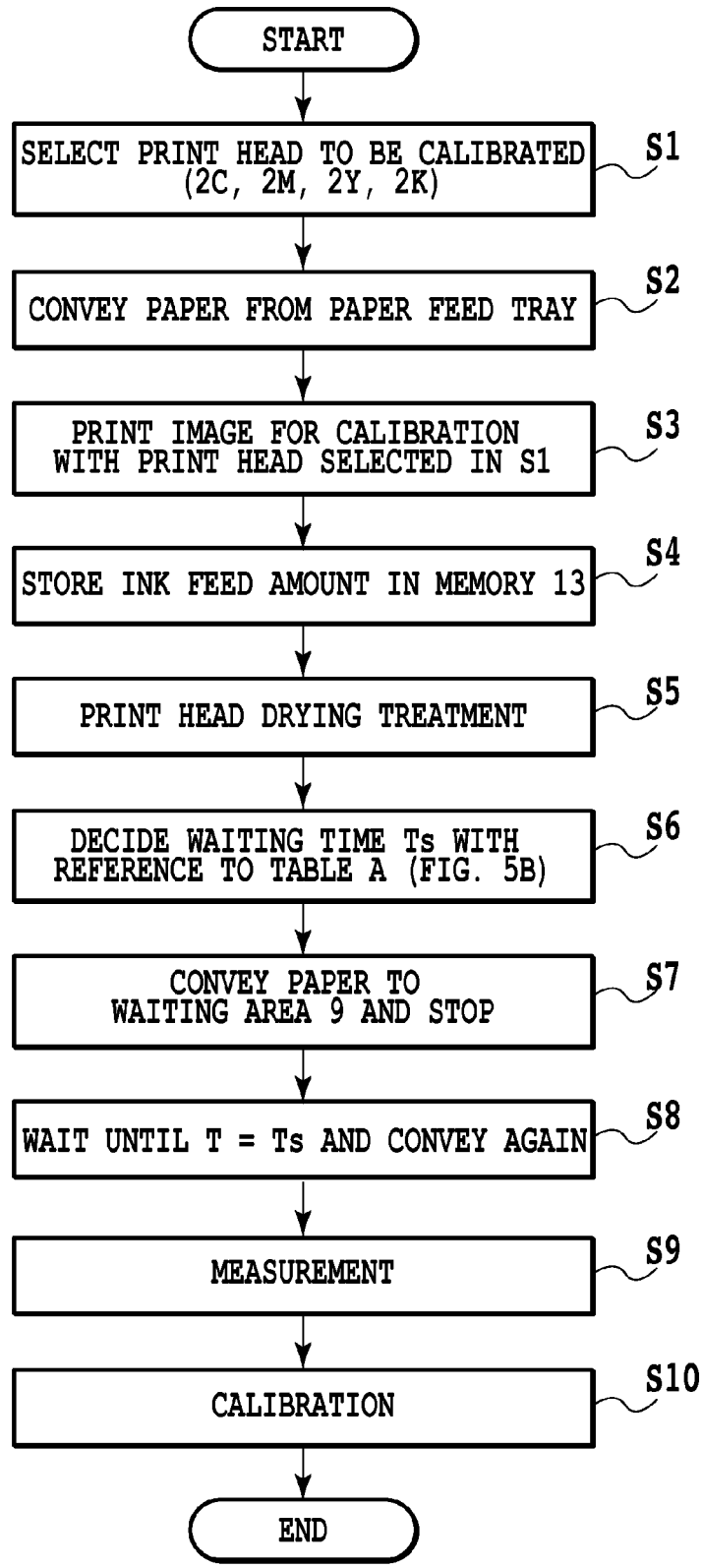
FIG. 4 is a flow chart illustrating a series of treatment and processing from printing an image for calibration to calibration based on the measurement result of the image, in calibration according to a first embodiment of the present invention.

FIG. 4 is a flow chart illustrating a series of treatment and processing from printing an image for calibration to calibration based on the measurement result of the image, in calibration according to a first embodiment of the present invention. The treatment and processing in the case where calibration is performed for one print head 2C will be described below to simplify explanation.

In FIG. 4, first, a print head to be calibrated is selected (Step 1). Next, the printing paper 3 is fed from the paper feed tray 4 (Step 2). The fed printing paper 3 is carried by the conveying rollers 5 and an image for calibration of a primary color is printed on the printing paper, using the print head 2C that ejects a cyan ink (Step 3).

Figures 5A, 5B:
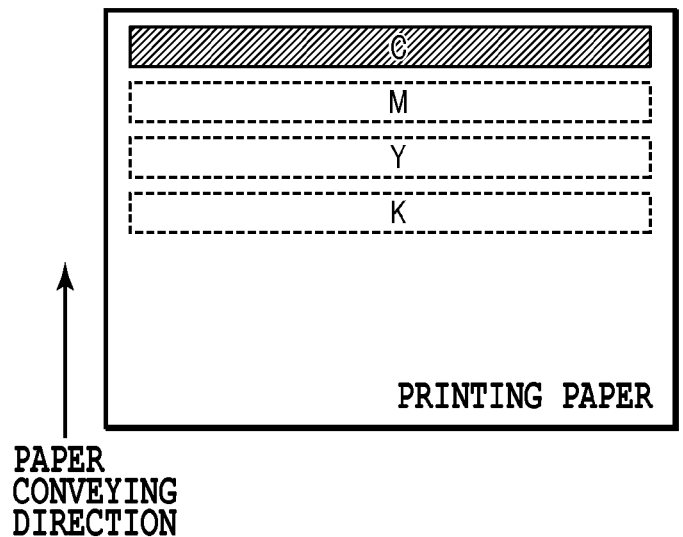
FIG. 5A is a view of an image for calibration that is used in the first embodiment.
FIG. 5B is "waiting time table A" in which a waiting time Ts is set depending on an ink type (information of a print head to be calibrated that is selected in Step 1) and an ink feed amount (patch density information) in printing a patch.

FIG. 5A is a view of an image for calibration that is used in the present embodiment. As illustrated in FIG. 5A, the image for calibration is composed of patches, each of them being printed by each of the print heads. Each of these patches is printed with an ink fed amount (density) that is set depending on a type of the printing paper or by setting by an operator. Next to printing of the image for calibration in Step 3, information (2C) to specify the print head to be calibrated and information of the ink fed amount when the patch was printed, are stored in the memory 13 (Step 4). Next, the printing paper on which the image for calibration was printed is carried to the drying treatment unit 6 and is subject to forced drying (Step 5).

At the end of drying treatment in Step 5, a moisture content W1 of the printing paper on which the image for measurement was printed is less than the equilibrium moisture content WO in the humidity of the ambient atmosphere outside of the drying treatment unit. The printing paper in this state absorbs the moisture in the ambient atmosphere immediately after it leaves the drying treatment unit, so that the printing paper increases its moisture content. Along with this, the color or density of the patch of the printing paper is changing. Dealing with this change, in the next Step 6 and after, a waiting time Ts is decided, and the start of a measurement processing in the next step is delayed for the waiting time.

According to the present embodiment, from a viewpoint that a time required to stabilize a color varies depending on an ink type and an ink feed amount on a printing medium, the waiting time Ts as a time for stabilizing is variably set depending on printing information (ink type and ink feed amount) when an image for calibration was printed.

FIG. 5B is "waiting time table A" in which a waiting time Ts is set depending on an ink type (information of a print head to be calibrated that is selected in Step 1) and an ink feed amount (patch density information) in printing a patch. Here, "an ink feed amount" is represented by an ink amount per unit area that is landed on the printing paper by ejection. As actual ink feed amount information, density information in printing the patch is used. That is, this density information finally becomes binary data, and the number of ejections per aforementioned unit area (×an amount of one ink droplet) is the aforementioned ink feed amount when ink is ejected according to this binary data. FIG. 5B shows that even if the ink feed amount is the same 6 g/m$^2$, for example, waiting times of C, M, Y and K inks are 10, 60, 10 and 20 seconds, respectively and different from each other. FIG. 5S illustrates only one example of a relation between an ink feed amount and a waiting time according to the ink type shown in FIG. 5B, and the relation is not limited to this example. The waiting time may be set to be variable depending on ink properties and a type of a printing medium on which an image for calibration is printed.

Returning to FIG. 4, next to the drying treatment in Step 5, in Step 6, the control unit 12 decides the waiting time Ts on the basis of the ink type information (information of the selected print head) and ink feed amount information stored in the memory 13, referring to the waiting time table A. Along with this, the dried printing paper is carried to the waiting area 9 and stopped (Step 7), and a time period T after stopping is measured and a measurement processing in the next step is delayed until this time period T reaches the waiting time Ts. Then, when the time period T reaches the waiting time Ts, the conveying rollers are rotated again to convey the printing paper to the position of the measuring instrument 10 (Step 8).

Next, the density of the patch printed on the printing paper is measured using the measuring instrument 10 (Step 9). Then, on the basis of the measurement result obtained in Step 9, the control unit 12 generates or reset control parameters of the print heads 2 so that a printing density of normal printing is within a suitable predetermined density range (Step 10). Examples of control parameters of the print heads that are reset in this Step 10 include an energy of a pulse applied to an energy generation element in ejecting ink and a control temperature of the print head. Another manner for calibrating a density property includes generating or changing a parameter of image processing such as gamma correction on image data of an image to be printed. For example, if the measurement result is less than an ideal density range, an image processing parameter is generated or changed so as to increase the density of image data. The present invention is not limited by a manner of calibration. Herein, these various calibrations are named generically "calibration of printing properties".

As described above, according to the present embodiment, when one print head that is subject to calibration is calibrated, calibration can be performed without too much or too little waiting time after drying until starting measurement. This minimizes the waiting time in the necessary extent and permits measuring an image for measurement whose color has been stabilized.

Second Embodiment

In the aforementioned first embodiment, one print head is calibrated in one calibration processing, but in the second embodiment of the present invention, a plurality of print heads are calibrated in one calibration processing. An example in which density properties of print heads 2C and 2Y are simultaneously calibrated will be described below.

Figure 6A:
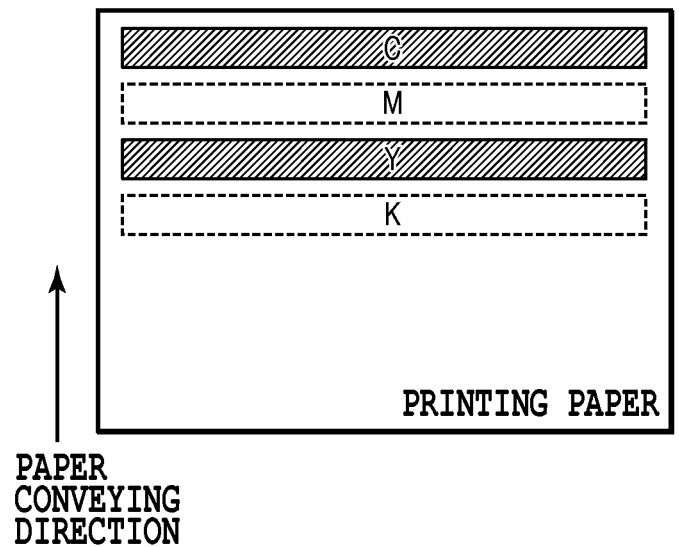
FIG. 6A is a view of an image for calibration according to a second embodiment of the present invention, in which two print heads are simultaneously calibrated.

FIG. 6A is a view of an image for calibration in the case where two print heads 2C and 2Y are simultaneously calibrated. As illustrated in FIG. 6A, by performing printing on a single printing paper with the print heads 2C and 2Y, a series of treatment and processing such as drying treatment and measurement after printing can be performed at one time. Here, a series of treatment and processing is the same as those of the aforementioned first embodiment, except for a decision method of a waiting time.

As described above, a time period required for stabilizing the color after drying varies depending on conditions such as an ink type and an ink feed amount. Therefore, if a plurality of treatment and processing is simultaneously performed, a waiting time corresponding to the most time-consuming condition is employed. For example, if patches are printed with the print head 2C and an ink feed amount 12 g/m$^2$ as well as the print head 2Y and an ink feed amount 12 g/m$^2$ respectively, waiting time periods of respective cases are 10 and 20 seconds, according to the waiting time table A in FIG. 5B. Therefore, the waiting time Ts is decided to be a longer waiting time, that is, 20 seconds, comparing the both cases.

Figure 6B:
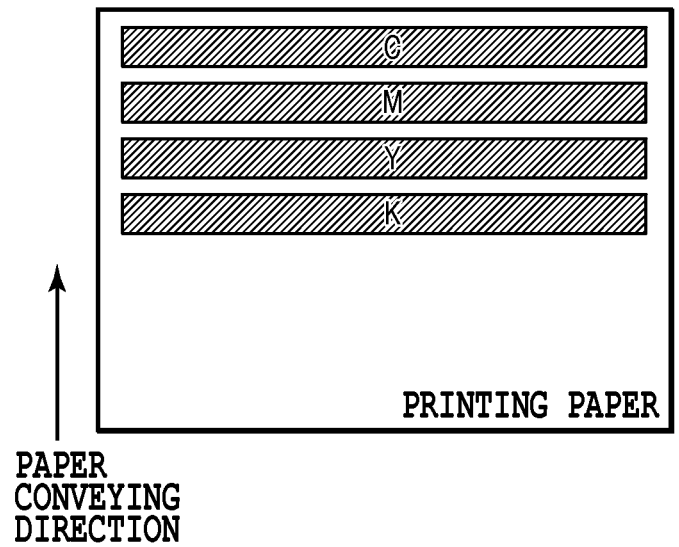
FIG. 6B is a view of an image for calibration in the case where four print heads are simultaneously calibrated.

The arbitrary number of print heads can be simultaneously calibrated. For example, all print heads mounted in the printing apparatus may be simultaneously calibrated. FIG. 6B is a view of an image for calibration in the case where four print heads are simultaneously calibrated. In FIG. 6B, respective patches for the four print heads are printed in an array for respective print heads (ink colors) on a single printing paper, which permits simultaneously performing the subsequent series of treatment and processing. In setting a waiting time, the longest waiting time is selected among ink feed amount conditions of each of four print heads, refereeing to the table in FIG. 5B.

Third Embodiment

A third embodiment of the present invention permits selectively performing the mode 1 in which the aforementioned primary color patches are printed and calibration is performed on the basis of them or the mode 2 in which patches are printed with different colors such as secondary colors overlapping those of the primary colors and calibration is performed on the basis of them. According to the present embodiment, these modes for calibration are associated with a type of printing paper on which an image for calibration is printed, that is, a type of the printing paper used for printing, as will be described later. For example, in the case where printing is performed with different colors of inks being overlapped each other, if a printing paper whose color development largely changes is used, calibration is performed in the mode 2.

Figure 7A:
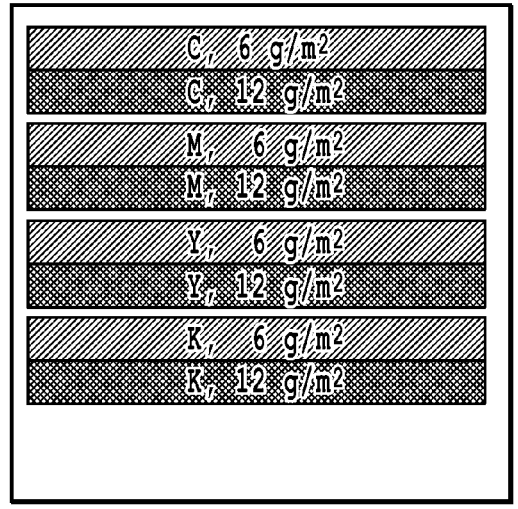
FIG. 7A is a view of an image for calibration in mode 1 for primary colors according to a third embodiment of the present invention.
Figure 7B:
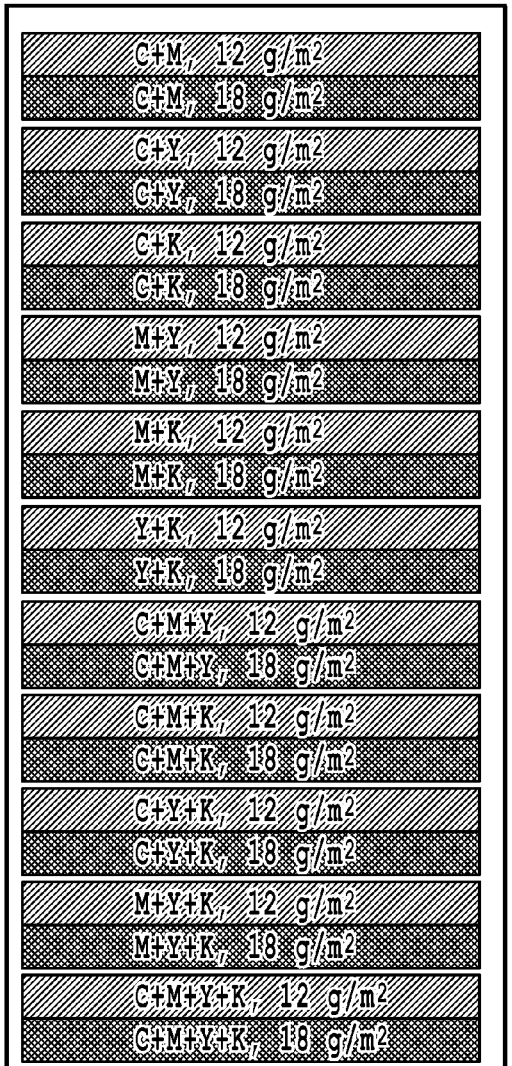
FIG. 7B is a view of an image for calibration in mode 2 for secondary and more colors.

FIG. 7A is a view of an image for calibration in the mode 1 for primary colors. FIG. 7B is a view of an image for calibration in the mode 2 for secondary and more colors. In the image for calibration in the mode 1 illustrated in FIG. 7A, primary colors' patches, which are printed with two levels of ink feed amounts (6, 12 g/m$^2$) for each of the print heads 2C, 2M, 2Y and 2K, are arrayed on a single printing paper. In the image for calibration in the mode 2 illustrated in FIG. 7B, secondary and more colors' patches, which are printed by a combination of each of the print heads 2C, 2M, 2Y and 2K, are arrayed on the printing paper. In FIG. 7B, ink feed amounts (12, 18 g/m$^2$) shown on the respective patches are total ink feed amounts of each combination of ink colors. Here, that the total ink feed amounts of C and M inks is 18 g/m$^2$ means setting density data of each of C, M inks for printing patches to be, for example, 9 g/m$^2$ of the C ink and 9 g/m$^2$ of the M ink. It should be appreciated that the ratio of respective ink feed amounts is not limited to an equal ratio as the aforementioned example, and this ratio can be set when patches for calibration are designed depending on the specification of the printing apparatus and so on.

FIG. 8A is a table indicating different waiting times for each ink feed amount, which is used in calibration processing in the mode 2 ("waiting time table B"). As shown in FIG. 8A, the longest waiting time is for a secondary color patch that is printed with 18 g/m$^2$ of the total ink feed amounts of magenta (M) and yellow (Y), which is 200 seconds. Accordingly, if the image for calibration illustrated in FIG. 7B is printed and calibration is performed in the mode 2, the waiting time Ts is set to be 200 seconds.

In calibration in the mode 1 for printing an image for calibration in FIG. 7A, according to the waiting time table A in FIG. 5B, the longest waiting time is for a patch printed with 12 g/m$^2$ of an ink feed amount of magenta (M) ink, which is 120 seconds. Accordingly, if calibration is performed in the mode 1, the waiting time Ts is set to be 120 seconds.

FIG. 8B is "waiting time table according to mode" in which the longest waiting time set as described above for each mode for calibration is associated with each mode. In the present embodiment, as described below, the mode for calibration is decided depending on the type of a printing paper used for calibration or the setting by an operator and according to the decided mode a waiting time is variably set, referring to the table in FIG. 8B.

Figure 9:
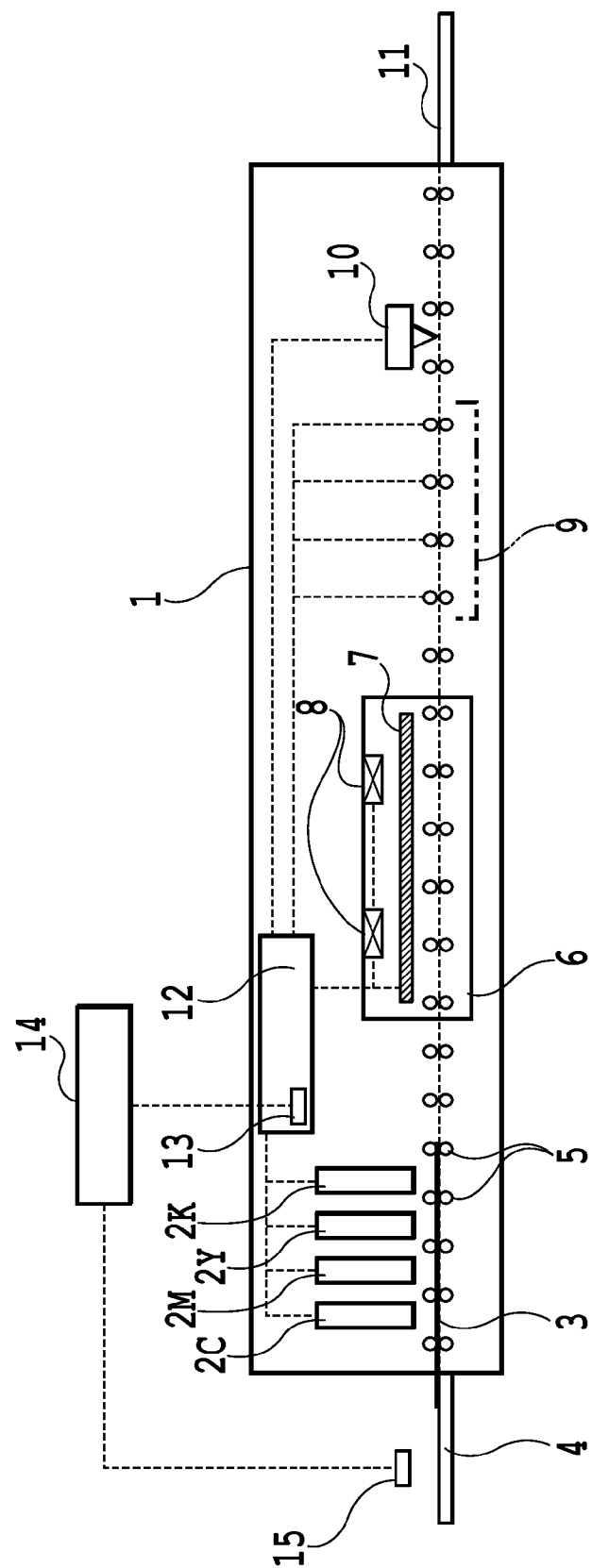
FIG. 9 is a view illustrating a configuration of an inkjet printing apparatus according to a third embodiment.

FIG. 9 is a view illustrating a configuration of an inkjet printing apparatus according to the present embodiment. The configuration of the printing apparatus according to the present embodiment is a configuration in which a mode input unit 14 and a paper type detection sensor 15 to detect a type of a printing medium fed from the paper feed tray 4 are added to the configuration illustrated in FIG. 3. The mode input unit 14 and paper type detection sensor 15 are connected to the control unit 12 by signals. Mode information input by an operator via the mode input unit 14 as well as the printing paper type information detected by the paper type detection sensor 15 are sent to the control unit 12, which performs calibration on the basis of these information as will be described with reference to FIG. 11.

Figure 11:
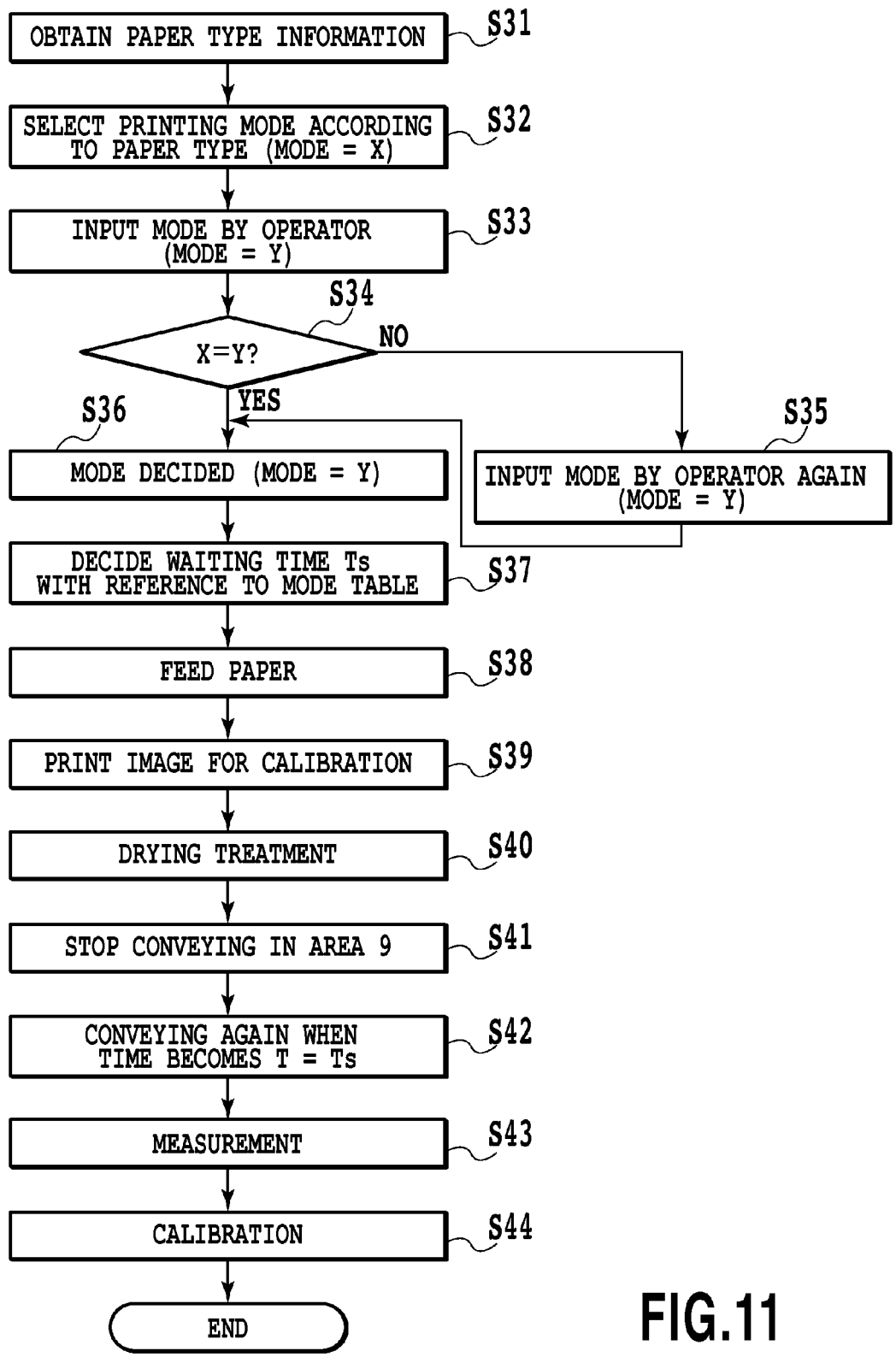
FIG. 11 is a flow chart illustrating calibration processing according to the third embodiment.

FIG. 11 is a flow chart illustrating calibration processing according to the present embodiment. First, in Step 31, printing paper type information detected by the paper type detection sensor 15 is obtained. Next, in Step 32, the mode for calibration is selected on the basis of the printing paper type information, referring to "Paper Type Mode Table" in FIG. 10.

Next, a mode is input by an operator (Step 33). It is determined whether this input result is identical to the mode selected in Step 32 (Step 34). If they are identical, the processing continues to Step 36. If not, the operator is notified that the modes are different from each other, and the operator inputs a mode again (Step 35). This input mode is decided as a final mode (Step 36). Processing in Steps 31, 32, 34, 35 and 36 is performed in order that the operator does not forget to set switching of modes when the printing paper type changes. Therefore, it is not essential for the present calibration processing. That is, processing from Steps 31 to 36 can be reduced to only the processing of Step 33.

When the mode is decided, the control unit 12 decides a waiting time Ts associated with the mode decided in Step 36, referring to the waiting time table according to the mode in FIG. 8B (Step 37). Along with this, the printing paper is carried from a paper feed unit (Step 38) and an image for calibration corresponding to the mode is printed with the use of a corresponding print head (Step 39). Then, the printing paper is subject to drying treatment (Step 40), carried to and stopped in the waiting area 9 (Step 41) where the printing paper waits for the waiting time Ts decided in Step 37. After the waiting, the printing paper is carried again (Step 42) and each of the patches is measured by the measuring instrument 10 (Step 43). The corresponding print head is calibrated on the basis of the measurement result, as described in the first embodiment (Step 44).

In the aforementioned embodiments, description was made with respect to cases where four types of inks are used. However, the present invention can be applied to a case where more types of inks are used.

In the aforementioned embodiments, patches are measured, and calibration such as setting control parameters of the print head is performed on the basis of the measurement values. However, the application of the present invention is not limited to such a manner. For example, the measurement result may be printed and output on the printing paper, or be displayed on a display unit, and thereby be notified to the operator. Then, in response to this notification, the operator can perform setting for color tuning via an operation unit of the apparatus, for example. That is, the present invention can be applied to any manner in which, after some printed image for measurement is dried, a waiting time until measurement is set to be variable as the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-113210, filed May 17, 2010, which is hereby incorporated by reference herein in its entirety.

What is claimed is:

1. An apparatus comprising:
    a printing unit comprising a plurality of inkjet heads respectively corresponding to a plurality of colors;
    a drying unit configured to dry a printing medium on which color patterns for calibration were printed by the inkjet heads;
    a measurement unit configured to measure the color patterns printed on the printing medium dried by the drying unit; and
    a control unit configured to set a measurement waiting time until the measurement unit begins a measurement, wherein the control unit determines a waiting time for each of the color patterns depending on an ink type and an ink feed amount associated with printing each of the color patterns, and sets the measurement waiting time to be a longest waiting time among the waiting times for the color patterns.

2. The apparatus according to claim 1, wherein the control unit is further configured to calibrate a printing property associated with printing with the inkjet heads, on the basis of a measurement result by the measurement unit.

3. The apparatus according to claim 2, wherein the control unit is further configured to (i) permit selecting from a plurality of modes for calibration, the plurality of modes including a first mode in which primary color patterns are printed and a second mode in which multiple overlapped color patterns are printed, and (ii) select one of the plurality of modes is depending on a printing medium type.

4. The apparatus according to claim 3, further comprising:
    a paper feed unit configured to feed a printing medium, wherein the control unit is further configured to select any of the plurality of modes depending on a type of a printing medium fed from the paper feed unit.

5. A calibration method, comprising:
    drying a printing medium on which a plurality of color patterns for calibration were printed using a plurality of inkjet heads respectively corresponding to a plurality of colors;
    measuring the color patterns printed on the dried printing medium;
    setting a measurement waiting time until the measurement begins by determining a waiting time for each of the color patterns depending on an ink type and an ink feed amount associated with printing each of the color patterns, and setting the measurement waiting time to be a longest waiting time among the waiting times for the color patterns; and
    calibrating a printing property on the basis of a measurement result.

* * * * *